[19] United States Patent
Magee et al.

[11] Patent Number: 4,664,877
[45] Date of Patent: May 12, 1987

[54] PASSIVE DEPRESSURIZATION SYSTEM

[75] Inventors: Robert D. Magee, Monroeville Boro, Pa.; Michael J. Asztalos, Shorewood, Ill.; Vuong D. Trinh, Penn Hills Township, Allegheny County, Pa.

[73] Assignee: Westinghouse Electric Corp., Pittsburgh, Pa.

[21] Appl. No.: 685,886

[22] Filed: Dec. 24, 1984

[51] Int. Cl.[4] .............................................. G21C 9/00
[52] U.S. Cl. .................................. 376/307; 376/283; 376/298; 376/299
[58] Field of Search ................... 165/104.32; 376/283, 376/298, 299, 307

[56] References Cited

U.S. PATENT DOCUMENTS 3,506,539  4/1970  Rigg ..................................... 376/307
4,051,892 10/1977  Reinsch ............................... 376/299

FOREIGN PATENT DOCUMENTS 1564546 12/1969  Fed. Rep. of Germany ...... 376/299
 887252  1/1962  United Kingdom ................ 376/307

Primary Examiner—Deborah L. Kyle
Assistant Examiner—Richard W. Wendtland
Attorney, Agent, or Firm—Daniel C. Abeles

[57] ABSTRACT

A passive depressurization system for use during cold shutdown of a pressurized water reactor receives saturated steam from the reactor's pressurizer, condenses the steam to water, and returns the water to a nozzle within the pressurizer in order to provide a cooling spray which condenses steam within the pressurizer. The depressurization system may include coiled tubing, which is connected to input and output ports of the depressurization system by redundant valves, or a condenser formed by a housing having air vents provided by vent elements through the housing.

9 Claims, 4 Drawing Figures

FIG. 1

PASSIVE DEPRESSURIZATION SYSTEM

BACKGROUND OF THE INVENTION

The present invention is related to a passive depressurization system, and more particularly to a system for passively depressurizing the reactor coolant system of a pressurized water nuclear reactor during the process of bringing the reactor to a cold shutdown state.

A typical pressurized water reactor includes, inter alia, a reactor vessel which contains nuclear fuel, a coolant heated by the nuclear fuel, and means for monitoring and controlling the nuclear reaction. The coolant is frequently water and, for the sake of convenience, the coolant will be referred to as "water" hereafter although it will be understood that other coolants could be used. The water heated in the reactor vessel is conveyed from and returned to the vessel by a reactor coolant system which includes one or more reactor coolant loops, each loop including a hot leg conveying hot water from the reactor vessel to a steam generator and a cold leg returning the water to the reactor vessel. The steam generator is a heat exchanger which transfers heat from the reactor coolant system to water from a source isolated from the reactor coolant system; the resulting steam is conveyed to a turbine to generate electricity.

During normal operation of the reactor, the water within the reactor vessel and the loops of the reactor coolant system is maintained at a high pressure in order to keep the water from boiling. A pressurized is provided to regulate the pressure. Since the reactor vessel and all of the loops of the reactor coolant system are hydraulically connected, only one pressurizer is needed to regulate the pressure within the entire system. The pressurizer includes a vessel which is filled with water and steam at equilibrium conditions and which is hydraulically connected to the hot leg of one of the reactor coolant system loops. The pressure within the system is sensed by transducers within the pressurizer. If the pressure is too low, immersion heating elements within the pressurizer are turned on in order to generate additional steam within the pressurizer and thereby raise the pressure, this increased pressure being communicated to the reactor vessel and the reactor coolant loops connected thereto. On the other hand if the pressure is too high, relatively cool water from the cold leg of one (or more) of the reactor coolant system loops is sprayed into the pressurizer in order to condense some of the steam therein and thereby reduce the system pressure. As a safety feature, a valve system is provided to vent the pressurizer to a pressure relief tank in order to ensure that the pressure within the system does not become excessive.

Due to the radioactive materials employed in a nuclear reactor, extreme care must be taken to avoid a malfunction which might release fission products into the environment. Merely designing the system to withstand the rigors of normal operation is not sufficient, since components may malfunction and anomalous events, such as seismic shocks, may occur. In short, in the interest of public safety the reactor must be designed so as to avoid, under all credible conditions, any substantial risk that harmful amounts of radioactive materials may be released into the environment. The public safety is, of course, a joint concern of Government and those in the nuclear industry.

In the United States, the Government has determined that a pressurized water reactor should be designed so that it can be brought to a cold shutdown condition within 36 hours, under any realistic accident condition and using only safety related equipment. This basically means that it must be possible to reduce the temperature and pressure of the water to less than 200° F. and 400 PSIG ($2.76 \times 10^7$ dynes/cm$^2$, gauge pressure) within 36 hours, even in the event that electrical power is lost or some other failure occurs, using highly reliable components that have been certified to operate under certain adverse conditions (rather than control grade components, which are suitable for use under normal conditions but which have not been qualified under various standards).

After the nuclear reaction has been stopped, the cold shutdown can be achieved in two stages. The first stage, which will be discussed in more detail below, is to cool and depressurize the reactor coolant system to an intermediate level, such as 350° F. (177° C.) and 400 PSIG ($2.76 \times 10^7$ dynes/cm$^2$, gauge pressure). At this point the second stage is begun, and is conducted by a residual heat removal system. A typical residual heat removal system includes two heat removal units, each heat removal unit including a heat exchanger, valving, and a pump to convey water through the valving and heat exchanger from a hot leg to at least two cold legs. It is of course redundant to use two heat removal units, each connected to at least two cold legs, but this redundancy provides a safety feature which permits a cold shutdown to be achieved even in the event that one of the heat removal units fails. The components in the heat removal units are sufficiently robust to withstand the intermediate pressure and temperature that is achieved upon completion of the first step.

The first stage of the cold shutdown procedure typically employs the steam generators to reduce the heat in the reactor coolant system. To reduce the pressure, steam is typically vented from the pressurizer to the pressure relief tank. This venting of steam to the pressure relief tank has several disadvantages. First, the water condensed from the steam must subsequently be decontaminated. This is expensive and may, moreover, delay the time when operation of the reactor can resume. Furthermore the steam is preferably vented in several steps by opening and closing motor operated valves. Each operation of the valve increases the possibility of mechanical failure, even assuming that electrical power is available.

SUMMARY OF THE INVENTION

Accordingly, one object of the present invention is to provide a depressurization system which is safer and more efficient than the system used heretofore.

Another object of the present invention is to provide a depressurization system which does not convey steam from contaminated water to the pressure relief tank.

Another object of the present invention is to provide a depressurization system which removes steam from the pressurizer and condenses the steam outside of the pressurizer in order to provide a cooling spray for condensing yet more steam within the pressurizer.

These and other objects are attained by providing a passive depressurization system having an input port connected to the pressurizer, an output port connected to a spray nozzle within the pressurizer, and a steam condenser unit located above the pressurizer and connected between the input and output ports. Redundant valves are connected between the condenser and each of the input and output ports. During operation the valves connected to the input port are fully opened in order to provide steam to the condenser unit, while the valves connected to the output port are slowly opened in order to regulate the flow rate to the nozzle in the pressurizer in order to avoid thermal shock. The condenser unit may, for example, be a coil or a container having vent elements to permit the ambient air to cool the steam. If desired a fan may blow air through the vent elements, and furthermore the air blown by the fan may be exposed to cooling coils.

BRIEF DESCRIPTION OF THE DRAWINGS

FIG. 1 is a schematic diagram of a pressurized water nuclear reactor having the passive pressure relief system of the present invention connected thereto;

DESCRIPTION OF THE PREFERRED EMBODIMENTS

Figure 1:
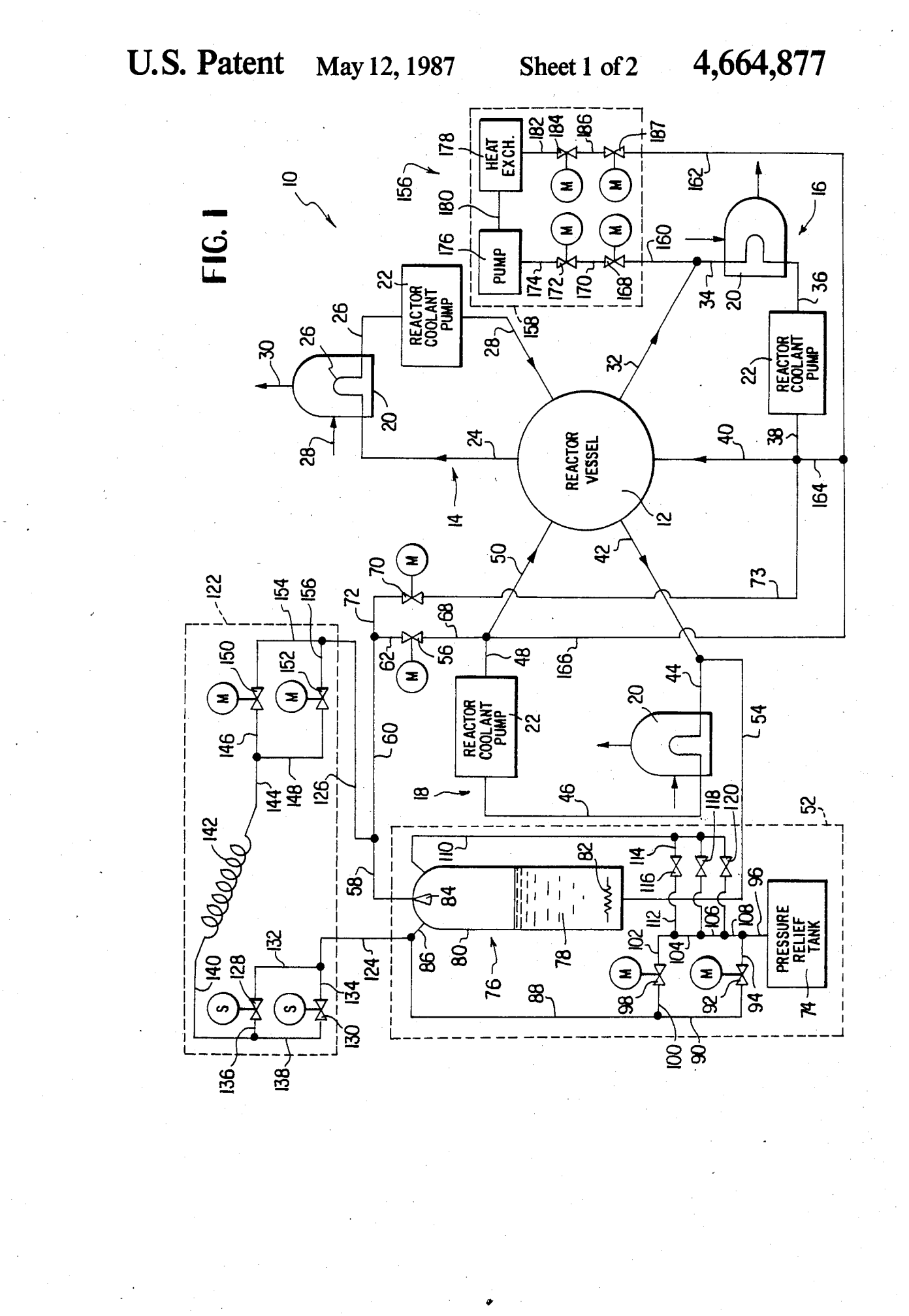
Figure 2:
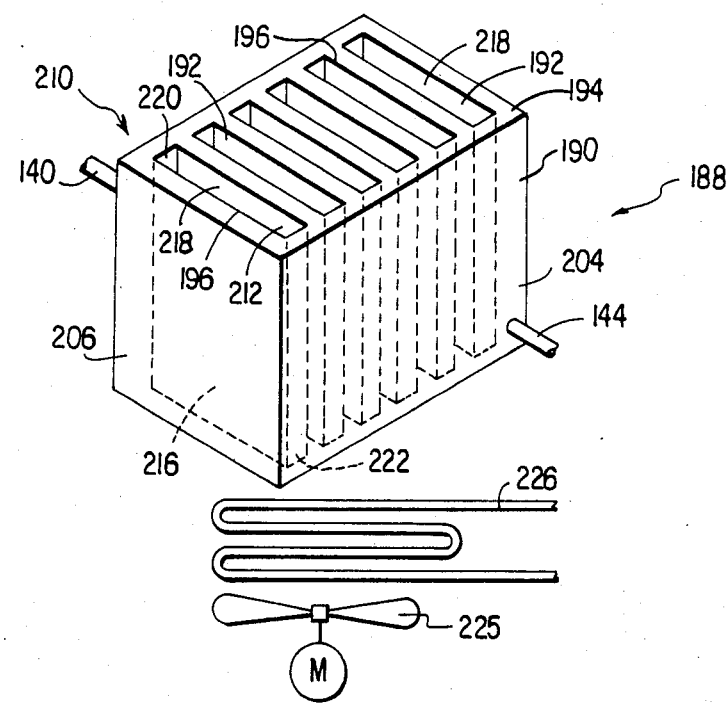
FIG. 2 is a perspective view of a condenser which can be used with the passive depressurization unit of the present invention, and additionally illustrates schematically cooling coils and a fan for blowing air through the condenser.

Referring first to FIG. 1, reactor 10 includes a reactor vessel 12 in fluid communication with a reactor coolant system which includes reactor coolant system loops 14, 16, and 18. Each of loops 14, 16 and 18 includes a hot leg to convey water from vessel 12 to a steam generator 20 and a cold leg to return the water to vessel 12 via a reactor coolant pump 22. In loop 14, for example, the hot leg is provided by conduit 24 while the cold leg includes pump 22 and conduits 26 and 28. Steam generator 20 is essentially a heat exchanger having a tubing system, illustrated schematically as loop 26, which transfers heat from the reactor coolant system to water entering via port 28 and exiting via port 30 as steam, which is subsequently conveyed to a turbine (not illustrated). In a similar manner the hot leg of loop 16 includes conduits 32 and 34 and the cold leg of loop 16 includes pump 22 and conduits 36, 38, and 40. The hot leg of loop 18 includes conduits 42 and 44, while the cold leg includes a pump 22 and conduits 46, 48, and 50.

With continuing reference to FIG. 1, pressure control system 52 is connected to the hot leg of one loop (here loop 18) and, for the sake of redundancy, to the cold legs of two loops (here loops 18 and 16). The connection to the hot leg of loop 18 is provided by conduit 54 and the connection to the cold leg of loop 18 is provided, via motor controlled valve 56, by conduits 58, 60, 62, and 68. The connection to the cold leg of loop 16 is provided, via motor controlled valve 70, by conduits 58, 60, 72, and 73.

With continuing reference to FIG. 1, pressure control system 52 includes a pressure relief tank 74 and a pressurizer 76, which has a bottom portion 78 that is filled with saturated water and a top portion 80 that is filled with saturated steam. An immersion heater 82 is provided in bottom portion 78 while a spray nozzle 84 is mounted in top portion 80. Top portion 80 communicates with pressure relief tank 74 via conduit 86, conduit 88, conduit 90, motor controlled valve 92, conduit 94, and conduit 96. In order to provide redundancy in case valve 92 should fail, motor controlled valve 98 is connected between conduits 88 and tank 74 by conduits 100, 102, 104, 106, 108, and 96. Transducers (not illustrated) munted within pressurizer 76 produce signals which open valves 92 and 98 when the pressure within pressurizer 76 exceeds a predetermined maximum, such as 150 atmospheres (about $1.5 \times 10^8$ dynes/cm$^2$), thereby venting steam to tank 74. As a precaution in the event that electrical power for operating valves 92 and 98 is unavailable, conduit 110 connects top portion 80 to conduit 104 via conduits 112 and 114 and spring operated valve 116. Valve 116 is set to open at a pressure which is slightly higher than the pressure at which valves 92 and 98 open. For the sake of redundancy, spring operated valves 118 and 120 are connected in parallel with valve 116.

At this point it is appropriate to review the operation of pressure control system 52. The interior of pressurizer 76 is in hydraulic communication with the hot leg of loop 18, and thus with the reactor coolant system, via conduit 54. Assume that the pressure in loop 18 drops for some reason, such as an abnormally large electrical load on the turbines (not illustrated) connected to ports 30 of steam generators 20. The transducer (not illustrated) within pressurizer 76 will sense the pressure drop and electrical current will be supplied to heater 82, thereby converting some of the water in bottom portion 78 to steam and increasing the pressure within pressurizer 76. Since pressurizer 76 is in hydraulic communication with loop 18, the pressure increase within pressurizer 76 will raise the pressure throughout the reactor coolant system. On the other hand if the pressure becomes too high, valves 56 and 70 are opened in order to provide relatively cool water to nozzle 84. The water sprayed by nozzle 84 condenses steam in upper portion 80. Since the volume of a gram of steam is greater than the volume of a gram of water, under the pressures and temperatures encountered within pressurizer 76, the result of this condensation is a pressure decrease within pressurizer 76. This pressure decrease is conveyed to the reactor coolant system by conduit 54. Ordinarily heater 82 and the cooling spray from nozzle 84 are sufficient to adequately regulate the pressure within the reactor coolant system. That is to say, during normal operation steam is not conveyed to pressure relief tank 74. During a high pressure transient, however, valves 92 and 98 are opened to relieve the pressure before it becomes dangerous, and valves 116-120 are provided for even further safety.

During a cold shutdown, the nuclear reaction in vessel 12 is terminated, the temperature and pressure of the water in the reactor coolant system is reduced during a first stage, and then the residual heat is removed during a second stage. In the embodiment of FIG. 1, the first stage of this process brings the temperature and pressure to 350° F. (177° C.) and 400 PSIG ($2.76 \times 10^7$ dynes/cm$^2$, gauge pressure), the initiating conditions for the second stage.

During the first stage of the cold shutdown process, pumps 22 force water through steam generators 20, which withdraw heat from the water and thereby reduce the water temperature. The pressure is reduced by passive depressurization system 122 of the present invention.

With continuing reference to FIG. 1, passive depressurization system 122 has an input port provided by conduit 124, which communicates with upper portion 80 of pressurizer 76 via conduit 86, and an output port provided by conduit 126, which communicates with spray nozzle 84 via conduit 58. Conduit 124 conveys steam to solenoid operated valves 128 and 130 via conduits 132 and 134, respectively. Thereafter the steam is conveyed via conduits 136, 138, and 140 to the input end of a steam condensing unit which, in the embodiment of FIG. 1, is provided by coiled tubing 142. The steam condensing unit removes heat from the steam, thereby condensing it to water which flows out the exit end of tubing 142 to conduit 144 and thence, via conduits 146 and 148, motor operated valves 150 and 152, and conduits 154 and 156 to conduit 126.

To reduce the pressure in the reactor coolant system during the first stage of the cold shutdown process, the solenoids of valves 130 and 136 are energized, from a remote location, in order to fully open the valves. Two valves are used rather than only one as a safety precaution, guarding against the remote possibility that one of the valves might fail to operate. The opening of valves 128 and 130 permits steam from pressurizer 76 to enter coiled tubing 142, where the steam condenses to form water. Valves 150 and 152 are opened to permit the condensed water to flow to spray nozzle 84, where it provides a cooling spray to condense the water within upper portion 80 of pressurizer 76. The motors which operate valves 150 and 152 are controlled so that the valves open slowly, thereby providing first a trickle and then a flood of water to nozzle 84 in order to avoid thermal shock to nozzle 84. After valves 128, 130, 150, and 152 are opened at the start of the first stage of the cold shut down, they remain open until the first stage is terminated. It will be apparent that the condensation of steam in coil tubing 142 to provide a quenching spray delivered to nozzle 84 efficiently reduces the pressure within pressurizer 76 and that this reduced pressure is communicated via conduit 54 to the reactor coolant system; accordingly, the pressure in vessel 12 and loops 14, 16, and 18 is reduced as steam generators 20 lower the temperature of the water.

The rate of heat removal by steam generators 20 becomes relatively slow after the water temperature in the reactor coolant system has reached about 350° F. (177° C.). At this temperature, and after passive depressurization system 112 has reduced the pressure to 400 PSIG ($2.76 \times 10^7$ dynes/cm$^2$), the second stage of the cold shutdown process begins. Because of the reduced pressure and temperature when the second stage is initiated, the second stage apparatus for accomplishing the final cooling need not be designed to withstand the pressures and temperatures which steam generators 20, for example, must withstand during operation of reactor 10.

With continuing reference to FIG. 1, the apparatus for accomplishing the second stage of the sold shut down process is a residual heat removal system 156, which includes two heat removal units, only one of which is illustrated in FIG. 1 in order to avoid unnecessarily cluttering the drawing. Heat removal unit 158 has an input port provided by conduit 160, which is connected to the hot leg of one of the loops (here loop 16), and an output port provided by conduit 162, which for the sake of the safety afforded by redundancy is connected to the cold legs of at least two loops. In the embodiment of FIG. 1, conduit 162 is connected to the cold leg of loop 16 by conduit 164 and to the cold leg of loop 18 by conduit 166. Conduit 160 conveys hot water via motor operated valve 168, conduit 170, motor operated valve 172, and conduit 174 to pump 176. Heat exchanger 178, which withdraws heat from the water in the reactor coolant system, is connected to pump 176 by conduit 180 and to conduit 162 by conduit 182, motor operated valve 184, conduit 186, and motor operated valve 187. After valves 168, 172, 184, and 187 are opened upon the initiation of the second stage of the cold shutdown process, pump 176 forces water through heat exchanger 178 until a cold shutdown condition is achieved. The remaining heat removal unit (not illustrated) is provided for the sake of redundancy and is, like unit 158, connected between the hot leg of a loop and the cold legs of two loops.

Figure 3:
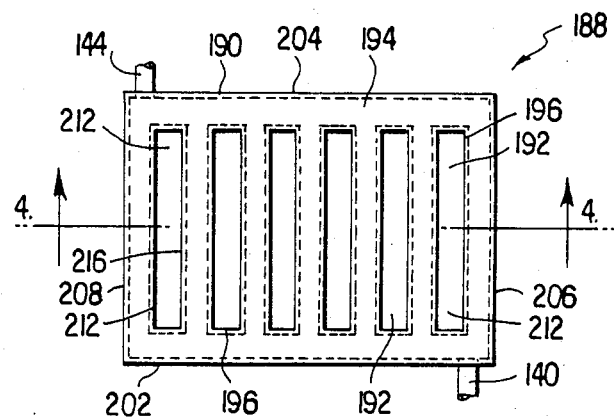
FIG. 3 is a top plan view of the condenser of FIG. 2.
Figure 4:
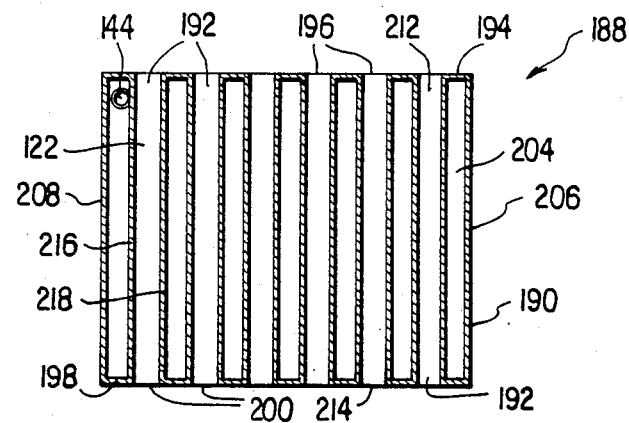
FIG. 4 is a sectional view taken along the line 4—4 of FIG. 3.

Turning next to FIGS. 2–4, a steam condensing unit which can be used in lieu of coiled tubing 142 will now be described. Condenser 188 includes an outer housing 190 which has air vents 192 running through it to accommodate a flow of air that removes heat from the steam within outer housing 190. Outer housing 190 includes a top panel 194 having elongated slots 196 therein and a similar bottom panel 198 having elongated slots 200 therein. Housing 190 also includes side walls 202 and 204, through which conduits 140 and 144, respectively, pertrude, and end walls 206 and 208.

With continuing reference to FIGS. 2–4, condenser 188 also includes vent elements 210, each of which includes an open top end 212, an open bottom end 214, and walls 216, 218, 220 and 222. Top ends 212 of vent elements 210 are welded to top panel 194 of housing 190 at slots 196 and bottom ends 114 of elements 110 are welded to bottom panel 198 at slots 200. It will be apparent that housing 190, with the vent elements 110 connected thereto, provides a closed container for the steam, with vent elements 210 providing the air vents 192 through the container.

With reference next to FIG. 2, fan 225 forces air through condenser 188 in order to condense the steam. The air blown by fan 225 is preferably chilled, for example by cooling coils 226.

In the embodiment of FIGS. 2–4, condenser 188 is dimensioned to provide a heat removal capacity of approximately $3.8 \times 10^5$ BTU's ($9.58 \times 10^7$ calories) per hour, and is able to condense about 150 cubic feet (4.25 m$^3$) per hour of saturated steam. The pressurization system 122, with condenser 188 therein, is typically able to reduce the pressure in the reactor coolant system of a reactor 10 having a 2785 megawatt thermal capacity to 400 PSIG ($2.76 \times 10^7$ dynes/cm$^2$, gauge pressure) in in about hours.

In the foregoing discussion it will be apparent that the passive depressurization system of the present invention is able to safely achieve depressurization during the cold shutdown procedure without venting contaminated steam to the pressure relief tank. The depressurization system has an input port which is connected to the pressurizer and which conveys saturated steam to a condenser unit and thence, via an exit port, to a spray nozzle within the pressurizer. The condenser unit is preferably a condenser having an outer housing with air vents through it provided by vent elements which are welded to the housing.

It will be understood that the above description of the present invention is susceptible to various modifications, changes, and adaptations, and the same are intended to be comprehended within the scope and range of sequivalents of the appended claims.

We claim:

1. In a pressurized water reactor having at least one reactor coolant system loop and a pressurizer hydraulically connected to said at least one loop, said pressurizer having a top portion to accommodate steam and having a spray nozzle in said top portion, a cold shutdown passive depressurization system comprising:
  a condenser unit;
  input port means for receiving steam from the top portion of the pressurizer;
  first means for conveying steam from said input port means to said condenser unit, said first means having at least one first valve therein which is closed except during cold shutdown;
  second means for receiving liquid condensed by said condenser unit, said second means having at least one second valve therein which is closed except during cold shutdown; and
  output port means connected to said second means for returning condensed liquid to the nozzle within the pressurizer in order to provide a cooling spray that condenses steam in the top portion of the pressurizer.

2. The system of claim 1, wherein said at least one first valve and said at least one second valve are electrically operated to open during cold shutdown.

3. The system of claim 1, wherein said condenser unit comprises coiled tubing.

4. The system of claim 1, wherein said condenser unit comprises a condenser having an outer housing and a plurality of vent elements affixed to said housing to provide air vents through said housing.

5. The system of claim 4, wherein said outer housing comprises a top panel having a plurality of openings therein, a bottom panel having a plurality of openings therein, and walls connecting the top and bottom panels.

6. The system of claim 5, wherein each of said vent elements has a plurality of walls extending between an open top end and an open bottom end, the top end of each vent element being sealingly affixed to said top panel at an opening therein and the bottom end of each vent element being sealingly affixed to said bottom panel at an opening therein.

7. The system of claim 1, further comprising means for forcing air through said condenser unit.

8. The system of claim 7, further comprising means for cooling the air forced through said condenser unit.

9. The system of claim 1, wherein said condenser unit comprises a condenser having a box-shaped outer housing with top and bottom panels, said top and bottom panels each having a plurality of elongated openings therein, said condenser additionally including means sealingly connected to said top and bottom panels adjacent to said openings for providing a plurality of air vents through said housing, each air vent having an axis that is vertically disposed and having a cross section, taken in a plane perpendicular to said axis, that is elongated.

* * * * *